US012630743B2

(12) United States Patent
Yoshino

(10) Patent No.: US 12,630,743 B2
(45) Date of Patent: May 19, 2026

(54) POLISHING COMPOSITION, POLISHING METHOD, AND METHOD FOR PRODUCING SEMICONDUCTOR SUBSTRATE

(71) Applicant: FUJIMI INCORPORATED, Kiyosu (JP)

(72) Inventor: Tsutomu Yoshino, Kiyosu (JP)

(73) Assignee: FUJIMI INCORPORATED, Kiyosu (JP)

(*) Notice: Subject to any disclaimer, the term of this patent is extended or adjusted under 35 U.S.C. 154(b) by 358 days.

(21) Appl. No.: 18/119,510

(22) Filed: Mar. 9, 2023

(65) Prior Publication Data

US 2023/0312982 A1 Oct. 5, 2023

(30) Foreign Application Priority Data

Mar. 30, 2022 (JP) ................................ 2022-056492

(51) Int. Cl.
*C09G 1/02* (2006.01)
*B24B 7/22* (2006.01)

(52) U.S. Cl.
CPC ................ *C09G 1/02* (2013.01); *B24B 7/228* (2013.01)

(58) Field of Classification Search
CPC .......... C09G 1/02; C09G 1/04; C09K 3/1463; C09K 3/1454; B24B 7/228; H01L 21/304; H01L 21/30625; H01L 21/3212
See application file for complete search history.

(56) References Cited

U.S. PATENT DOCUMENTS

2018/0066161 A1 3/2018 Tsuchiya et al.
2019/0010358 A1* 1/2019 Iwata ..................... C09K 13/00
2020/0303198 A1* 9/2020 Kadohashi .......... H01L 21/3212
2020/0308449 A1 10/2020 Mae et al.

FOREIGN PATENT DOCUMENTS

CN 111718656 A 9/2020
JP 2004-273502 A 9/2004
JP 2020-164780 A 10/2020
TW 202100708 A 1/2021
WO WO-2016/132676 A1 8/2016

OTHER PUBLICATIONS

JP Notice of Reasons for Refusal issued in corresponding JP Application No. 2022-056492 Dated Jul. 8, 2025 (8 pages).
Office Action in Taiwanese Appl. No. 11520052450 dated Jan. 15, 2026 (24 pages with English translation).

* cited by examiner

*Primary Examiner* — Amber R Orlando
*Assistant Examiner* — Ryan Patrick Loughran
(74) *Attorney, Agent, or Firm* — Foley & Lardner LLP

(57) ABSTRACT

Provided is a means capable of sufficiently removing residues on a surface of an object to be polished while polishing the object to be polished at a moderate speed.
Provided is a polishing composition containing: anionically-modified colloidal silica; a dispersing medium; an anionic water-soluble polymer which is a copolymer including a structural unit having a sulfonic acid group or a salt group thereof and a structural unit having a carboxy group or a salt group thereof; a polypropylene glycol having a weight average molecular weight of 200 or more and 700 or less; a nitrogen-free non-ionic polymer other than the polypropylene glycol having a weight average molecular weight of 200 or more and 700 or less; and a nitrogen-containing non-ionic polymer.

10 Claims, No Drawings

POLISHING COMPOSITION, POLISHING METHOD, AND METHOD FOR PRODUCING SEMICONDUCTOR SUBSTRATE

CROSS-REFERENCE TO RELATED APPLICATION

The entire disclosure of Japanese Patent Application No. 2022-056492, filed on Mar. 30, 2022, is incorporated herein by reference in its entirety.

BACKGROUND

1. Technical Field

The present invention relates to a polishing composition, a polishing method, and a method for producing a semiconductor substrate.

2. Description of Related Arts

Due to high integration brought about by miniaturization of an LSI (Large Scale Integration) manufacturing process, electronic devices such as computers have achieved high performance such as miniaturization, multi-functionality, and high speed. A chemical mechanical polishing (CMP) method is used in a new fine processing technique accompanying such high integration of LSI.

The formation of a metal plug and wiring in a semiconductor device is generally performed by forming a conductor layer formed of a metal on a film of a silicon oxide film, a silicon nitride film, a polysilicon film, or the like in which a recess is formed, and then removing a part of the conductor layer by polishing until the film is exposed. This polishing step is roughly divided into a main (bulk) polishing step of performing polishing for removing most of an object to be removed and a finish (buff) polishing step of finish polishing the object (for example, JP 2004-273502 A).

SUMMARY

In recent years, the thinning of the film has progressed, and there is an increasing need for means for improving the surface state of the object to be polished by reducing the polishing speed and gently polishing the film in the finish polishing step. In the finish polishing step, it is also required to sufficiently remove residues on the surface of the object to be polished.

Therefore, an object of the present invention is to provide a means capable of sufficiently removing residues on a surface of an object to be polished while polishing the object to be polished at a moderate speed.

The present inventors have conducted intensive studies in view of the above problems. As a result, the present inventors have found that the above problems can be solved by a polishing composition containing: anionically-modified colloidal silica; a dispersing medium; an anionic water-soluble polymer which is a copolymer including a structural unit having a sulfonic acid group or a salt group thereof and a structural unit having a carboxy group or a salt group thereof; a polypropylene glycol having a weight average molecular weight of 200 or more and 700 or less; a nitrogen-free non-ionic polymer other than the polypropylene glycol having a weight average molecular weight of 200 or more and 700 or less; and a nitrogen-containing non-ionic polymer, thereby completing the present invention.

DETAILED DESCRIPTION

The present invention is a polishing composition containing: anionically-modified colloidal silica; a dispersing medium; an anionic water-soluble polymer which is a copolymer including a structural unit having a sulfonic acid group or a salt group thereof and a structural unit having a carboxy group or a salt group thereof; a polypropylene glycol having a weight average molecular weight of 200 or more and 700 or less; a nitrogen-free non-ionic polymer other than the polypropylene glycol having a weight average molecular weight of 200 or more and 700 or less; and a nitrogen-containing non-ionic polymer. According to such a polishing composition of the present invention, there is provided a means capable of sufficiently removing residues remaining on a surface of an object to be polished while gently polishing the surface thereof.

The present inventors presume a mechanism in which the polishing composition according to the present invention moderates the polishing speed with respect to the object to be polished, and further, removes residues on the surface of the object to be polished as follows.

That is, various polymers (the anionic water-soluble polymer, the polypropylene glycol having a weight average molecular weight of 200 or more and 700 or less, the nitrogen-free non-ionic polymer other than the polypropylene glycol having a weight average molecular weight of 200 or more and 700 or less, and the nitrogen-containing non-ionic polymer) contained in the polishing composition of the present invention act on the surface of the object to be polished, so that the speed of polishing the surface of the object to be polished becomes moderate, and residues are also removed from the surface of the object to be polished. Details of these mechanisms are unknown, but it is considered that various polymers are effectively adsorbed to the object to be polished by the configuration of the present invention, whereby the surface of the object to be polished is moderately protected from the abrasive grains (anionically-modified colloidal silica), and the polishing speed becomes moderate. It is considered that various polymers are effectively adsorbed by the object to be polished, whereby residues on the surface of the object to be polished can be efficiently detached, and further, reattachment of residues (contaminants) to the surface can be prevented. With the configuration of the present invention, various polymers adsorbed on the surface of the object to be polished can also be easily detached from the surface of the object to be polished, and various polymers adsorbed on the surface of the object to be polished hardly become residues or are do not become residues. From the above, it is considered that, in the polishing composition of the present invention, the polishing speed of the object to be polished by the abrasive grains (anionically-modified colloidal silica) can be made moderate, and residues on the surface can be sufficiently removed.

The above mechanism is based on speculation, and the present invention is not limited to the above mechanism at all.

The polishing composition according to the present invention is typically supplied to an object to be polished in the form of a polishing liquid containing the polishing composition, and is used for polishing the object to be polished. The polishing composition according to the present invention may be, for example, diluted (typically, diluted with water) and used as polishing liquid, or may be used as it is as a polishing liquid. That is, the concept of the polishing composition according to the present invention includes both a polishing composition (working slurry) supplied to an object to be polished and used for polishing the object to be polished and a concentrated solution (a stock solution of a working slurry) diluted and used for polishing. The concentration rate of the concentrated solution can be, for example, about 2 to 100 times on a volume basis, and usually about 5 to 50 times is appropriate.

Hereinafter, embodiments of the present invention will be described in detail; however, the present invention is not limited only to the following embodiments. Throughout the present specification, unless particularly stated otherwise, any expression in a singular form should be understood to encompass the concept of its plural form. Therefore, unless particularly stated otherwise, the article specifying a single form (for example, "a", "an", "the", and the like in the case of English language) should be understood to encompass the concept of its plural form. Furthermore, unless particularly stated otherwise, any term used in the present specification should be understood as a term that is used to have the meaning conventionally used in the relevant technical field. Therefore, unless defined otherwise, all the technical terms and scientific terms used in the present specification have the same meaning as generally understood by a person ordinarily skilled in the art to which the present invention is pertained. If there is any conflict in meaning, the present specification (including the definitions) takes priority. In addition, in the present specification, unless otherwise specified, operations and measurements of physical properties and the like are performed under conditions of room temperature (20° C. or higher and 25° C. or lower)/relative humidity of 40% RH or more and 50% RH or less.

<Residue>

In the present specification, the residues represent foreign substances attached to the surface of the object to be polished. Examples of the residues include, although not particularly limited, other residues such as organic residues described below, particle residues derived from abrasive grains contained in the polishing composition, residues composed of components other than the particle residue and the organic residues, and a mixture of the particle residues and the organic residues.

The total number of residues represents the total number of all residues regardless of the type. The total number of residues can be measured using a wafer defect inspection apparatus (optical inspection machine Surfscan (registered trademark) SP5; manufactured by KLA-Tencor Corporation). Details of the method for measuring the number of residues will be described in Examples described below.

In the present specification, the organic residues represent components composed of organic substances such as an organic low-molecular-weight compound and a polymer compound, an organic salt, or the like, among foreign substances attached to the surface of the object to be polished.

Examples of the organic residues adhering to the object to be polished include pad debris generated from a pad used in a polishing step, and components derived from additives contained in the polishing composition used in the polishing step.

Since the organic residues and other foreign substances are greatly different in color and shape, it is possible to visually determine whether or not the foreign substance is an organic residue by SEM observation. Whether or not the foreign substance is an organic residue may be determined by element analysis using an energy dispersive X-ray analyzer (EDX) as necessary. The number of organic residues can be measured using a wafer defect inspection apparatus and SEM or EDX elemental analysis.

Object to be Polished

In the present specification, the object to be polished means an object to be polished using the polishing composition according to the present invention. Specific examples of the object to be polished include, but are not particularly limited to, a film formed on a surface of a semiconductor substrate or the like.

The material contained in the object to be polished according to the present invention is not particularly limited, and examples thereof include carbon-containing silicon such as silicon oxide, silicon nitride (SiN), and silicon carbonitride (SiCN), silicon materials doped with impurities such as silicon oxynitride, polycrystalline silicon (polysilicon), amorphous silicon, and boron-containing silicon, simple metals, alloys, metal nitrides, and compound semiconductors such as SiGe. Among these, at least one of silicon nitride, silicon oxide, and polysilicon is preferably contained.

Examples of a film containing silicon oxide include a TEOS (Tetraethyl Orthosilicate) type silicon oxide film (hereinafter, also simply referred to as "TEOS film") produced using tetraethyl orthosilicate as a precursor, an HDP (High Density Plasma) film, a USG (Undoped Silicate Glass) film, a PSG (Phosphorus Silicate Glass) film, a BPSG (Boron-Phospho Silicate Glass) film, and an RTO (Rapid Thermal Oxidation) film. The film containing silicon oxide included in the object to be polished may be used singly or in combination of two or more kinds thereof.

The polishing composition according to an embodiment of the present invention can moderate the polishing speed of the surface of the object to be polished and reduce residues on the surface even when the object to be polished includes both a hydrophilic material and a hydrophobic material. Here, the hydrophilic material refers to a material having a contact angle with water of less than 50°, and the hydrophobic material refers to a material having a contact angle with water of 50° or more. The contact angle with water is a value measured by a contact angle meter DropMaster (DMo-501) manufactured by Kyowa Interface Science Co., Ltd.

Specific examples of the hydrophilic material include silicon oxide, silicon nitride, silicon oxynitride, tungsten, titanium nitride, tantalum nitride, and boron-containing silicon. These hydrophilic materials may be used singly or in combination of two or more kinds thereof. According to a preferred embodiment of the present invention, the hydrophilic material is silicon oxide and/or silicon nitride. Specific examples of the hydrophobic material include polycrystalline silicon, monocrystalline silicon, amorphous silicon, and carbon-containing silicon. These hydrophobic materials may be used singly or in combination of two or more kinds thereof. According to a preferred embodiment of the present invention, the hydrophobic material is polycrystalline silicon.

That is, according to a preferred embodiment of the present invention, the hydrophilic material is silicon oxide, and the hydrophobic material is polycrystalline silicon. According to a preferred embodiment of the present invention, the hydrophilic material is silicon nitride, and the hydrophobic material is polycrystalline silicon. According to a preferred embodiment of the present invention, the hydrophilic material is silicon oxide and silicon nitride, and the hydrophobic material is polycrystalline silicon.

<Polishing Composition>

The polishing composition according to the present invention contains an anionically-modified colloidal silica, a dispersing medium, an anionic water-soluble polymer, a polypropylene glycol, a nitrogen-free non-ionic polymer, and a nitrogen-containing non-ionic polymer. In the present specification, the "non-ionic polymer" refers to a polymer having no anionic group such as a carboxy group, a sulfonic acid group, or a phosphoric acid group or a cationic group such as an amino group or a quaternary ammonium group in the molecule. The "anionic polymer" refers to a polymer having an anionic group such as a carboxy group, a sulfonic acid group, or a phosphoric acid group in the molecule. Hereinafter, each polymer will be described.

(Anionically-Modified Colloidal Silica)

The polishing composition according to the present invention contains anionically-modified colloidal silica as abrasive grains. The anionically-modified colloidal silica is colloidal silica whose surface is modified with an anionic group, and has an action of mechanically polishing an object to be polished in the polishing composition.

Preferable examples of the anionically-modified colloidal silica include colloidal silica in which an anionic group such as a carboxy group, a sulfonic acid group, a phosphonic acid group, or an aluminate group is immobilized on the surface. A method for producing such colloidal silica having an anionic group is not particularly limited, and examples thereof include a method of reacting a silane coupling agent having an anionic group at a terminal with colloidal silica.

As a specific example, when the sulfonic acid group is immobilized on colloidal silica, it is possible to perform the immobilization, for example, by the method described in "Sulfonic acid-functionalized silica through quantitative oxidation of thiol groups", Chem. Commun. 246-247 (2003). Specifically, it is possible to obtain colloidal silica (sulfonic acid-modified colloidal silica) having a sulfonic acid group immobilized on the surface by coupling a silane coupling agent having a thiol group such as 3-mercaptopropyl trimethoxysilane to colloidal silica and then oxidizing the thiol group with hydrogen peroxide.

When the carboxy group is immobilized on colloidal silica, it is possible to perform the immobilization, for example, by the method described in "Novel Silane Coupling Agents Containing a Photolabile 2-Nitrobenzyl Ester for Introduction of a Carboxy Group on the Surface of Silica Gel", Chemistry Letters, 3, 228-229 (2000). Specifically, it is possible to obtain colloidal silica (carboxylic acid-modified colloidal silica) having a carboxy group immobilized on the surface by coupling a silane coupling agent containing a photoreactive 2-nitrobenzyl ester to colloidal silica and then irradiating with light.

In an embodiment of the present invention, the average primary particle size of the anionically-modified colloidal silica is preferably 10 nm or more, more preferably 15 nm or more, further preferably 20 nm or more, even more preferably 25 nm or more, and still more preferably 30 nm or more. In an embodiment of the present invention, the average primary particle size of the anionically-modified colloidal silica is preferably 60 nm or less, more preferably 50 nm or less, and further preferably 40 nm or less. When the anionically-modified colloidal silica has the above-described average primary particle size, there is an effect of reducing scratches, reducing the number of defects (the number of residues), and improving the polishing speed. As the average primary particle size in the present invention, a value measured by the method described in Examples is adopted.

In an embodiment of the present invention, the average secondary particle size of the anionically-modified colloidal silica is preferably 40 nm or more, more preferably 45 nm or more, further preferably 50 nm or more, even more preferably 55 nm or more, still more preferably 60 nm or more, and still more preferably 65 nm or more. In an embodiment of the present invention, the average secondary particle size of the anionically-modified colloidal silica is preferably less than 100 nm, more preferably 90 nm or less, further preferably 80 nm or less, and even more preferably 75 nm or less. When the anionically-modified colloidal silica has the above-described average secondary particle size, there is an effect that the polishing speed can be improved. As the average secondary particle size in the present invention, a value measured by the method described in Examples is adopted.

In an embodiment of the present invention, in the particle size distribution of the anionically-modified colloidal silica in the polishing composition, which is determined by a laser diffraction scattering method, the lower limit of the ratio of a particle diameter D90 when the integrated particle mass reaches 90% of the total particle mass from the fine particle side and a particle diameter D10 when the integrated particle mass reaches 10% of the total particle mass from the fine particle side (in the present specification, also simply referred to as "D90/D10") is preferably 1.3 or more, more preferably 1.4 or more, further preferably 1.5 or more, and even more preferably 1.6 or more. With such a lower limit, the effect that the polishing speed can be improved is obtained. In an embodiment of the present invention, the upper limit of D90/D10 of the anionically-modified colloidal silica is preferably 4.0 or less, more preferably 3.5 or less, further preferably 3.0 or less, and even more preferably 2.0 or less.

In an embodiment of the present invention, the lower limit of the aspect ratio of the anionically-modified colloidal silica is preferably 1.05 or more, more preferably 1.10 or more, and further preferably 1.15 or more. According to such an embodiment, a technical effect of improving the polishing speed is obtained. In an embodiment of the present invention, the upper limit of the aspect ratio of the anionically-modified colloidal silica is preferably 5 or less, more preferably 2 or less, and further preferably 1.5 or less. According to such an embodiment, a technical effect of improving dispersion stability and reducing the number of defects (the number of residues) is obtained. As the aspect ratio of the anionically-modified colloidal silica, an average value of values obtained by randomly extracting 300 abrasive grain images measured by FE-SEM and measuring the aspect ratio (major axis/minor axis) can be adopted.

The content of the anionically-modified colloidal silica in the polishing composition according to an embodiment of the present invention is not particularly limited. In the case of a polishing composition (is typically a slurry polishing liquid and is also referred to as a working slurry or a polishing slurry in some cases) directly used, as a polishing liquid, for polishing an object to be polished, from the viewpoint of reducing the surface roughness after polishing, the lower limit of the content of the anionically-modified colloidal silica in the polishing composition is preferably more than 0.001% by mass, more preferably 0.005% by mass or more, further preferably 0.01% by mass or more, even more preferably 0.05% by mass or more, still more preferably 0.1% by mass or more, still more preferably 0.3% by mass or more, particularly preferably 0.5% by mass or more, and most preferably 0.8% by mass or more, with respect to the total mass of the polishing composition. The upper limit of the content of the anionically-modified colloidal silica in the polishing composition directly used, as a polishing liquid, from the viewpoint of reducing the polishing speed, reducing scratches, and reducing the number of defects (the number of residues), for polishing an object to be polished is preferably 10% by mass or less, more preferably 5.0% by mass or less, further preferably 4.0% by mass or less, even more preferably 3.0% by mass or less, still more preferably 2.0% by mass or less, particularly preferably 1.5% by mass or less, and most preferably 1.3% by mass or less, with respect to the total mass of the polishing composition. In the present specification, the description regarding the content or the like of a certain substance means the total amount when two or more kinds of substances are contained. That is, the content of the anionically-modified colloidal silica in the polishing composition is preferably more than 0.001% by mass and 10% by mass or less, more preferably 0.005% by mass or more and 5.0% by mass or less, further preferably 0.01% by mass or more and 4.0% by mass or less, even more preferably 0.05% by mass or more and 3.0% by mass or less, still more preferably 0.1% by mass or more and 2.0% by mass or less, still more preferably 0.3% by mass or more and 2.0% by mass or less, particularly preferably 0.5% by mass or more and 1.5% by mass or less, and most preferably 0.8% by mass or more and 1.3% by mass or less, with respect to the total mass of the polishing composition.

In the case of a polishing composition diluted and used for polishing (that is, a concentrated solution or a stock solution of a working slurry), the lower limit of the content of the anionically-modified colloidal silica is preferably more than 1% by mass and more preferably 2% by mass or more, with respect to the total mass of the polishing composition, from the viewpoint of reducing the surface roughness after polishing, the viewpoint of taking advantage of being a concentrated solution, and the like. The upper limit of the content of the anionically-modified colloidal silica in the polishing composition diluted and used for polishing is usually appropriately 30% by mass or less and more preferably 25% by mass or less, from the viewpoint of storage stability, filterability, and the like. In the present specification, the description regarding the content or the like of a certain substance means the total amount when two or more kinds of substances are contained.

The polishing composition according to the present invention may further contain abrasive grain other than the anionically-modified colloidal silica as long as the effect of the present invention is not impaired. Such other abrasive grains may be any of inorganic particles, organic particles, and organic-inorganic composite particles. Specific examples of the inorganic particles include particles made of metal oxides, such as unmodified silica, cation-modified silica, alumina, ceria, and titania, silicon nitride particles, silicon carbide particles, and boron nitride particles. Specific examples of the organic particles include polymethyl methacrylate (PMMA) particles. The other abrasive grains may be used singly or in combination of two or more kinds thereof. As the other abrasive grains, a commercially available product or a synthetic product may be used.

However, the content of the other abrasive grains is preferably 20% by mass or less, more preferably 10% by mass or less, further preferably 5% by mass or less, and particularly preferably 1% by mass or less, with respect to the total mass of the abrasive grains. Most preferably, the content of the other abrasive grain is 0% by mass, that is, the abrasive grains are formed of only anionically-modified colloidal silica.

(Anionic Water-Soluble Polymer)

The polishing composition according to the present invention contains an anionic water-soluble polymer which is a copolymer including a structural unit having a sulfonic acid group or a salt group thereof and a structural unit having a carboxy group or a salt group thereof. The anionic water-soluble polymer acts as a dispersant in the polishing composition according to the present invention. Since the anionic polymer is adsorbed on the surface of the object to be polished (particularly, an object to be polished containing silicon nitride) and moderately protects the surface from being polished by abrasive grains (anionically-modified colloidal silica), the polishing speed can be made moderate. When the polishing composition according to the present invention contains the anionic polymer, the nitrogen-free non-ionic polymer and the nitrogen-containing non-ionic polymer adsorbed on the surface of the object to be polished (particularly, an object to be polished containing silicon nitride) are easily dissolved again in the polishing composition, so that these polymers are easily detached from the surface of the object to be polished, and as a result, residues on the surface of the object to be polished can be reduced.

In an embodiment of the present invention, examples of a monomer having a sulfonic acid group or a salt group thereof constituting the copolymer include a polyalkylene glycol-based monomer (A) described in paragraphs “0019” to “0036” of JP 2015-168770 A, and a sulfonic acid group-containing monomer (C) described in paragraphs “0041” to “0054” of the same publication.

In an embodiment of the present invention, examples of a monomer having a carboxy group or a salt group thereof constituting the copolymer include acrylic acid, methacrylic acid, crotonic acid, α-hydroxyacrylic acid, α-hydroxymethylacrylic acid, and salts such as metal salts, ammonium salts, and organic amine salts thereof.

In an embodiment of the present invention, a molar ratio of the structural unit derived from the monomer having a structural unit or a salt group thereof and the structural unit derived from the monomer having a carboxy group or a salt group thereof in the anionic water-soluble polymer is preferably the structural unit derived from the monomer having a sulfonic acid group: the structural unit derived from the monomer having a carboxy group=1:99 to 99:1 and more preferably 5:95 to 95:5.

The weight average molecular weight (Mw) of the anionic water-soluble polymer is preferably 1,500 or more, more preferably 3,000 or more, further preferably 5,000 or more, even more preferably 7,000 or more, particularly preferably 8,000 or more, and most preferably 9,000 or more. The weight average molecular weight of the anionic water-soluble polymer is preferably 1,000,000 or less, more preferably 500,000 or less, further preferably 100,000 or less, even more preferably 50,000 or less, particularly preferably 30,000 or less, and most preferably 15,000 or less. That is, the weight average molecular weight of the anionic polymer is preferably 1,500 or more and 1,000,000 or less, more preferably 3,000 or more and 500,000 or less, further preferably 5,000 or more and 100,000 or less, even more preferably 7,000 or more and 50,000 or less, particularly preferably 8,000 or more and 30,000 or less, and most preferably 9,000 or more and 15,000 or less. When the weight average molecular weight of the anionic polymer is within the above range, the speed of polishing the object to be polished can be further suppressed, and residues on the surface of the object to be polished can be more efficiently removed, so that the desired effect of the present invention is further exhibited.

In the present specification, also as described in Examples, the weight average molecular weight can be measured by gel permeation chromatography (GPC) using polyethylene glycol having a known molecular weight as a reference substance.

In an embodiment of the present invention, in the case of a polishing composition (is typically a slurry polishing liquid and is also referred to as a working slurry or a polishing slurry in some cases) directly used, as a polishing liquid, for polishing an object to be polished, the content of the anionic water-soluble polymer is preferably 0.01% by mass or more, more preferably 0.05% by mass or more, further preferably 0.10% by mass or more, particularly preferably 0.15% by mass or more, and most preferably 0.20% by mass or more, with respect to the total mass of the polishing composition. In an embodiment of the present invention, the content of the anionic water-soluble polymer is preferably 5.0% by mass or less, more preferably 3.0% by mass or less, further preferably 1.0% by mass or less, particularly preferably 0.50% by mass or less, and most preferably 0.45% by mass or less, with respect to the total mass of the polishing composition. That is, the content of the anionic water-soluble polymer is preferably 0.01% by mass or more and 5.0% by mass or less, more preferably 0.05% by mass or more and 3.0% by mass or less, further preferably 0.10% by mass or more and 1.0% by mass or less, particularly preferably 0.15% by mass or more and 0.50% by mass or less, and most preferably 0.20% by mass or more and 0.45% by mass or less.

In the case of a polishing composition diluted and used for polishing (that is, a concentrated solution or a stock solution of a working slurry), the upper limit of the content of the anionic water-soluble polymer is preferably 10% by mass or less and more preferably 5% by mass or less, with respect to the total mass of the polishing composition. The lower limit of the content of the anionic water-soluble polymer is preferably 0.1% by mass or more and more preferably 0.5% by mass or more.

In an embodiment of the present invention, the anionic water-soluble polymer may be any of a block copolymer, a random copolymer, a graft copolymer, and an alternating copolymer. As the anionic water-soluble polymer, a commercially available product or a synthetic product may be used. The anionic water-soluble polymer may be used singly or in combination of two or more kinds thereof. When two or more kinds of anionic water-soluble polymers are contained in the polishing composition, the content of the anionic water-soluble polymers is the total amount thereof.

(Polypropylene Glycol)

The polishing composition according to the present invention contains a polypropylene glycol having a weight average molecular weight of 200 or more and 700 or less. In the polishing composition, since the polypropylene glycol having a weight average molecular weight of 200 or more and 700 or less adsorbed on the surface of the object to be polished (particularly, a polysilicon film) and moderately protects the surface from being polished by abrasive grains (anionically-modified colloidal silica), the polishing speed can be made moderate. The polypropylene glycol having a weight average molecular weight of 200 or more and 700 or less is easily detached from the surface of the object to be polished (particularly, a polysilicon film), and as a result, the number of defects (the number of residues) of the object to be polished can be reduced. When the weight average molecular weight of the polypropylene glycol is less than 200, the polishing speed of the surface of the object to be polished (particularly, a polysilicon film) cannot be suppressed, which is not preferable. When the weight average molecular weight of the polypropylene glycol exceeds 700, the polypropylene glycol adsorbed on the surface of the object to be polished is less likely to be detached from the surface, and the polypropylene glycol itself tends to be a residue, which is not preferable.

The polypropylene glycol having a weight average molecular weight of 200 or more and 700 or less may be used singly or in combination of two or more kinds thereof. As the polypropylene glycol having a weight average molecular weight of 200 or more and 700 or less, a commercially available product or a synthetic product may be used.

The weight average molecular weight of the polypropylene glycol having a weight average molecular weight of 200 or more and 700 or less is preferably 200 or more and 600 or less, more preferably 200 or more and 500 or less, further preferably 200 or more and 450 or less, and particularly preferably 250 or more and 450 or less. When the weight average molecular weight of the polypropylene glycol is in this range, the number of residues can be further reduced.

In an embodiment of the present invention, in the case of a polishing composition (is typically a slurry polishing liquid and is also referred to as a working slurry or a polishing slurry in some cases) directly used, as a polishing liquid, for polishing an object to be polished, the lower limit of the content of the polypropylene glycol having a weight average molecular weight of 200 or more and 700 or less is preferably 0.01% by mass or more, more preferably 0.03% by mass or more, further preferably 0.05% by mass or more, particularly preferably 0.10% by mass or more, and most preferably 0.15% by mass or more, with respect to the total mass of the polishing composition. The upper limit of the content of the polypropylene glycol is preferably 5.0% by mass or less, more preferably 3.0% by mass or less, further preferably 1.0% by mass or less, particularly preferably 0.30% by mass or less, and most preferably 0.25% by mass or less, with respect to the total mass of the polishing composition. That is, the content of the polypropylene glycol is preferably 0.01% by mass or more and 5.0% by mass or less, more preferably 0.03% by mass or more and 3.0% by mass or less, further preferably 0.05% by mass or more and 1.0% by mass or less, particularly preferably 0.10% by mass or more and 0.30% by mass or less, and most preferably 0.15% by mass or more and 0.25% by mass or less, with respect to the total mass of the polishing composition. Within this range, the polishing speed of the surface of the object to be polished (particularly, a polysilicon film) can be more sufficiently reduced, and the number of residues on the surface can also be more sufficiently reduced.

In the case of a polishing composition diluted and used for polishing (that is, a concentrated solution or a stock solution of a working slurry), the upper limit of the content of the polypropylene glycol having a weight average molecular weight of 200 or more and 700 or less is preferably 10% by mass or less and more preferably 5% by mass or less, with respect to the total mass of the polishing composition. The lower limit of the content of the polypropylene glycol having a weight average molecular weight of 200 or more and 700 or less is preferably 0.05% by mass or more and more preferably 0.10% by mass or more. Within this range, the polishing speed of the surface of the object to be polished (particularly, a polysilicon film) can be more sufficiently reduced, and the number of residues on the surface can also be more sufficiently reduced.

(Nitrogen-Free Non-Ionic Polymer)

The polishing composition according to the present invention contains a nitrogen-free non-ionic polymer other than the polypropylene glycol having a weight average molecular weight of 200 or more and 700 or less. By the nitrogen-free non-ionic polymer interacting with the nitrogen-containing non-ionic polymer described below, the desired effect of the present invention is further exhibited. Details of this mechanism are unknown, but it is considered that a strong hydrophilic film is formed by hydrogen bonding between the hydroxy group in the nitrogen-free non-ionic polymer and the nitrogen element in the nitrogen-containing non-ionic polymer, and the hydrophilicity of the surface of the object to be polished (particularly, a polysilicon film) is improved, thereby preventing residues from adhering to the surface or residues detached from the surface from adhering again.

The nitrogen-free non-ionic polymer may be a non-ionic polymer having no nitrogen atom, and examples thereof include polyvinyl alcohol, polyethylene glycol, polyvinyl ethers (such as polyvinyl methyl ether, polyvinyl ethyl ether, and polyvinyl isobutyl ether), polyalkylene oxides (such as polyethylene oxide, polypropylene oxide, and polybutylene oxide), water-soluble polysaccharides such as polyglycerol, polypropylene glycol, polybutylene glycol and hydroxyethyl cellulose, alginic acid polyhydric alcohol esters, water-soluble urea resins, dextrin derivatives, and casein. As the nitrogen-free non-ionic polymer, not only those having the main chain structure as described above but also a graft copolymer having a non-ionic polymer structure in a side chain can be suitably used. The nitrogen-free non-ionic polymer may be a polymer having the same repeating structural unit (homopolymer) or different repeating structural units (copolymer), and the form of a copolymer when the nitrogen-free non-ionic polymer is a copolymer may be any of a block copolymer, a random copolymer, a graft copolymer, and an alternating copolymer.

The nitrogen-free non-ionic polymer is preferably selected from the group consisting of polyvinyl alcohol, hydroxyethyl cellulose, and polyglycerol, and is more preferably polyvinyl alcohol. The nitrogen-free non-ionic polymer may be used singly or in combination of two or more kinds thereof. As the nitrogen-free non-ionic polymer, a commercially available product or a synthetic product may be used.

A weight average molecular weight of the nitrogen-free non-ionic polymer is preferably 1,500 or more, more preferably 2,000 or more, further preferably 3,000 or more, even more preferably 4,500 or more, particularly preferably 5,500 or more, and most preferably 7,500 or more. The weight average molecular weight of the nitrogen-free non-ionic polymer is preferably 100,000 or less, more preferably 90,000 or less, further preferably 70,000 or less, even more preferably 50,000 or less, particularly preferably 25,000 or less, and most preferably 20,000 or less. The weight average molecular weight of the nitrogen-free non-ionic polymer is preferably 1,500 or more and 100,000 or less, more preferably 2,000 or more and 90,000 or less, further preferably 3,000 or more and 70,000 or less, even more preferably 4,500 or more and 50,000 or less, particularly preferably 5,500 or more and 25,000 or less, and most preferably 7,500 or more and 20,000 or less.

When the weight average molecular weight of the nitrogen-free non-ionic polymer is within the above range, the nitrogen-free non-ionic polymer is easily adsorbed to the object to be polished (for example, a film containing polysilicon), and residues on the surface of the object to be polished can be more efficiently removed after the treatment using the polishing composition, so that the desired effect of the present invention is further exhibited.

In an embodiment of the present invention, in the case of a polishing composition (is typically a slurry polishing liquid and is also referred to as a working slurry or a polishing slurry in some cases) directly used, as a polishing liquid, for polishing an object to be polished, the content of the nitrogen-free non-ionic polymer is preferably 0.001% by mass or more and 5% by mass or less, more preferably 0.005% by mass or more and 3% by mass or less, further preferably 0.01% by mass or more and 1% by mass or less, and particularly preferably 0.05% by mass or more and 0.5% by mass or less, with respect to the total mass of the polishing composition. In the case of a polishing composition diluted and used for polishing (that is, a concentrated solution or a stock solution of a working slurry), the content of the nitrogen-free non-ionic polymer is preferably 0.005% by mass or more and 25% by mass or less, and more preferably 0.025% by mass or more and 15% by mass or less, with respect to the total mass of the polishing composition. When two or more kinds of nitrogen-free non-ionic polymers are contained in the polishing composition, the content of the nitrogen-free non-ionic polymers is the total amount thereof.

(Nitrogen-Containing Non-Ionic Polymer)

The polishing composition according to the present invention contains a nitrogen-containing non-ionic polymer. As described above, the nitrogen-containing non-ionic polymer contributes to the exhibition of the intended effect according to the present invention by interacting with the nitrogen-free non-ionic polymer. In the polishing composition according to the present invention, the nitrogen-containing non-ionic polymer is adsorbed on the surface of the object to be polished (particularly, a film containing silicon oxide), so that the polishing speed of the surface becomes moderate, and further, reattachment of residues (contaminants) can be prevented.

The weight average molecular weight of the nitrogen-containing non-ionic polymer is preferably 1,500 or more, more preferably 5,000 or more, further preferably 9,000 or more, even more preferably 10,000 or more, particularly preferably 20,000 or more, and most preferably 40,000 or more. The weight average molecular weight of the nitrogen-free non-ionic polymer is preferably 1,000,000 or less, more preferably 500,000 or less, further preferably 300,000 or less, even more preferably 100,000 or less, particularly preferably 70,000 or less, and most preferably 50,000 or less. The weight average molecular weight of the nitrogen-free non-ionic polymer is preferably 1,500 or more and 1,000,000 or less, more preferably 5,000 or more and 500,000 or less, further preferably 9,000 or more and 300,000 or less, even more preferably 10,000 or more and 100,000 or less, particularly preferably 20,000 or more and 70,000 or less, and most preferably 40,000 or more and 48,000 or less. When the weight average molecular weight of the nitrogen-free non-ionic polymer is within the above range, the polishing speed with respect to the object to be polished becomes more moderate, and further, residues on the surface of the object to be polished can be more efficiently removed.

The nitrogen-containing non-ionic polymer may be a non-ionic polymer having a nitrogen atom, and examples thereof include polyamines, polyvinylpyrrolidone, polyacrylamide, poly-N-vinylacetamide, polydimethylacrylamide, polyacryloylmorpholine, poly-N-vinylcaprolactam, poly-N-isopropylacrylamide, and an oxazoline group-containing polymer. As the nitrogen-containing non-ionic polymer, not only those having the main chain structure as described above but also a graft copolymer having a non-ionic polymer structure in a side chain can be suitably used. The nitrogen-containing non-ionic polymer may be a polymer having the same repeating structural unit (homopolymer) or different repeating structural units (copolymer), and the form of a copolymer when the nitrogen-containing non-ionic polymer is a copolymer may be any of a block copolymer, a random copolymer, a graft copolymer, and an alternating copolymer.

The nitrogen-containing non-ionic polymer is preferably a polymer having an amide group or an oxazoline group, more preferably one or more selected from the group consisting of polyvinylpyrrolidone, poly-N-vinylacetamide, polydimethylacrylamide, poly-N-vinylcaprolactam, poly-N-isopropylacrylamide, and an oxazoline group-containing polymer, and further preferably polyvinylpyrrolidone. When the nitrogen-containing non-ionic polymer described above is used, the polishing speed of the object to be polished (particularly, a film containing silicon oxide) can be made more moderate, and further, residues on the surface of the object to be polished can also be more efficiently removed. The nitrogen-containing non-ionic polymer may be used singly or in combination of two or more kinds thereof. As the nitrogen-containing non-ionic polymer, a commercially available product or a synthetic product may be used.

When the nitrogen-containing non-ionic polymer is polyvinylpyrrolidone, the aforementioned nitrogen-free non-ionic polymer is preferably polyvinyl alcohol. By combining polyvinylpyrrolidone and polyvinyl alcohol, the polishing speed with respect to the object to be polished (particularly, a film containing silicon oxide) can be made more sufficiently moderate, and further, residues on the surface of the object to be polished can be more sufficiently removed.

In an embodiment of the present invention, in the case of a polishing composition (is typically a slurry polishing liquid and is also referred to as a working slurry or a polishing slurry in some cases) directly used, as a polishing liquid, for polishing an object to be polished, the content of the nitrogen-containing non-ionic polymer is preferably 0.001% by mass or more and 5% by mass or less, more preferably 0.005% by mass or more and 3% by mass or less, further preferably 0.01% by mass or more and 1% by mass or less, particularly preferably 0.01% by mass or more and 0.5% by mass or less, and most preferably 0.05% by mass or more and 0.5% by mass or less, with respect to the total mass of the polishing composition. In the case of a polishing composition diluted and used for polishing (that is, a concentrated solution or a stock solution of a working slurry), the content of the nitrogen-containing non-ionic polymer is preferably 0.005% by mass or more and 25% by mass or less, and more preferably 0.025% by mass or more and 15% by mass or less, with respect to the total mass of the polishing composition. When two or more kinds of nitrogen-containing non-ionic polymer are contained in the polishing composition, the content of the nitrogen-containing non-ionic polymer is the total amount thereof.

The ratio of the weight average molecular weight of the nitrogen-containing non-ionic polymer and the weight average molecular weight of the nitrogen-free non-ionic polymer (the nitrogen-containing non-ionic polymer/the nitrogen-free non-ionic polymer) is preferably 0.1 or more and 50 or less, more preferably 0.2 or more and 40 or less, further preferably 0.3 or more and 30 or less, and particularly preferably 0.3 or more and 5.5 or less. When the ratio of the weight average molecular weight of the nitrogen-containing non-ionic polymer and the weight average molecular weight of the nitrogen-free non-ionic polymer is within the above range, the nitrogen-free non-ionic polymer and the nitrogen-containing non-ionic polymer are easily adsorbed to the surface of the object to be polished (for example, a film containing silicon oxide or a film containing polysilicon), the speed of polishing the surface can be made moderate, and further, residues on the surface can be more efficiently removed, so that the desired effect of the present invention is further exhibited.

(Dispersing Medium)

The polishing composition according to the present invention contains a dispersing medium. The dispersing medium has a function of dispersing or dissolving each component. The dispersing medium preferably contains water, and more preferably only water. The dispersing medium may be a mixed solvent of water and an organic solvent for dispersing or dissolving each component. In this case, examples of the organic solvent to be used include acetone, acetonitrile, ethanol, methanol, isopropanol, glycerin, ethylene glycol, propylene glycol, and triethanolamine, which are organic solvents miscible with water. These organic solvents may be used without being mixed with water, and each component may be dispersed or dissolved and then mixed with water. These organic solvents can be used singly or in combination of two or more kinds thereof.

Water is preferably water that does not contain residues as much as possible from the viewpoint of preventing contamination of an object to be polished and preventing suppression of the action of other components. For example, water having a total content of transition metal ions of 100 ppb or less is preferable. Here, the purity of water can be increased by, for example, operations such as removal of residue ions using an ion exchange resin, removal of foreign substances by a filter, and distillation. Specifically, for example, deionized water (ion-exchanged water), pure water, ultrapure water, distilled water, or the like is preferably used.

(Other Polymers)

The polishing composition according to the present invention may further contain polymers other than the anionic water-soluble polymer, the polypropylene glycol having a weight average molecular weight of 200 or more and 700 or less, the nitrogen-free non-ionic polymer other than the polypropylene glycol having a weight average molecular weight of 200 or more and 700 or less, and the nitrogen-containing non-ionic polymer. As the other polymers, both a cationic polymer and an amphoteric polymer can be used. The other polymer is preferably a water-soluble polymer. The water-soluble polymer described herein refers to a water-soluble polymer having the same repeating structural unit (homopolymer), or a water-soluble polymer having different repeating structural units (copolymer), and is typically a compound having a weight average molecular weight (Mw) of 1000 or more.

Examples of the cationic polymer include polyethyleneimine (PEI), polyvinylamine, polyallylamine, polyvinylpyridine, and a polymer of cationic acrylamide.

Examples of the amphoteric polymer include a copolymer of a vinyl monomer having an anionic group and a vinyl monomer having a cationic group, and vinyl-based amphoteric polymers having a carboxybetaine group or a sulfobetaine group, and specifically include an acrylic acid/dimethylaminoethyl methacrylic acid copolymer and an acrylic acid/diethylaminoethyl methacrylic acid copolymer.

(Surfactant)

The polishing composition according to the present invention may further contain a surfactant. The type of surfactants is not particularly limited, and may be any of non-ionic, anionic, cationic, and amphoteric surfactants.

Examples of the non-ionic surfactant include compounds other than the polypropylene glycol, the nitrogen-free non-ionic polymer, and the nitrogen-containing non-ionic polymer described above, and examples thereof include alkyl ether type compounds such as polyoxyethylene lauryl ether and polyoxyethylene oleyl ether; alkylphenyl ether type compounds such as polyoxyethylene octylphenyl ether; alkyl ester type compounds such as polyoxyethylene laurate; alkylamine type compounds such as polyoxyethylene laurylamino ether; alkylamide type compounds such as polyoxyethylene lauric acid amide; polypropylene glycol ether type compounds such as polyoxyethylene polyoxypropylene ether; alkanolamide type compounds such as oleic acid diethanolamide; and allyl phenyl ether type compounds such as polyoxyalkylene allyl phenyl ether. In addition, propylene glycol, diethylene glycol, monoethanolamine, alcohol ethoxylate, alkylphenol ethoxylate, tertiary acetylene glycol, alkanolamide, and the like can also be used as the non-ionic surfactant. Since the nitrogen-free non-ionic polymer and the nitrogen-containing non-ionic polymer may have a function as a non-ionic surfactant, a separate non-ionic surfactant may not be added.

Examples of the anionic surfactant include compounds other than the anionic water-soluble polymer described above, and examples thereof include carboxylic acid type compounds such as sodium myristate, sodium palmitate, sodium stearate, sodium laurate, and potassium laurate; sulfuric acid ester type compounds such as sodium octyl sulfate; phosphoric acid ester type compounds such as lauryl phosphoric acid and sodium lauryl phosphate; and sulfonic acid type compounds such as sodium dioctyl sulfosuccinate and sodium dodecylbenzenesulfonate. Since the anionic polymer may have a function as the anionic surfactant, a separate anionic surfactant may not be added.

Examples of the cationic surfactant include amines such as laurylamine hydrochloride; quaternary ammonium salts such as polyethoxyamine and lauryltrimethylammonium chloride; and pyridium salts such as lauryl pyridinium chloride.

Examples of the amphoteric surfactant include lecithin, alkylamine oxide, an alkyl betaine such as N-alkyl-N,N-dimethylammonium betaine, and a sulfobetaine.

The surfactant can be used singly or in combination of two or more kinds thereof. As the surfactant, a commercially available product or a synthetic product may be used.

In the case of a polishing composition (is typically a slurry polishing liquid and is also referred to as a working slurry or a polishing slurry in some cases) directly used, as a polishing liquid, for polishing an object to be polished, the lower limit of the content of the surfactant is preferably 0.01% by mass or more and more preferably 0.05% by mass or more, when the total mass of the polishing composition is regarded as 100% by mass. The upper limit of the content of the surfactant is preferably 5% by mass or less and more preferably 1% by mass or less, when the total mass of the polishing composition is regarded as 100% by mass. When the polishing composition contains two or more kinds of surfactants, the content of the surfactants means the total amount thereof.

<pH of Polishing Composition>

The pH of the polishing composition according to an embodiment of the present invention is preferably 2.0 or more and less than 5.0. When the pH of the polishing composition is in this range, the polishing speed with respect to the surface of an object to be polished (particularly, an object to be polished containing silicon nitride) becomes moderate, and further, residues on the surface can also be further reduced.

The pH of the polishing composition according to an embodiment of the present invention is more preferably 2.0 or more and 4.5 or less, further preferably 2.0 or more and 4.0 or less, even more preferably 2.0 or more and 3.5 or less, particularly preferably 2.0 or more and 3.0 or less, and most preferably 2.2 or more and 2.8 or less. When the pH of the polishing composition is in this range, the polishing speed with respect to the object to be polished (particularly, an object to be polished containing silicon nitride) becomes more sufficiently moderate, and further, residues on the surface can also be further sufficiently reduced.

(pH Adjusting Agent)

The polishing composition according to the present invention may further contain a pH adjusting agent.

The pH adjusting agent is not particularly limited, but a known pH adjusting agent used in the field of polishing compositions can be used, and a known acid, base, salt thereof can be used. Examples of the pH adjusting agent include organic acids including carboxylic acids such as formic acid, acetic acid, propionic acid, butyric acid, valeric acid, caproic acid, enanthic acid, caprylic acid, pelargonic acid, capric acid, lauric acid, myristic acid, palmitic acid, margaric acid, stearic acid, oleic acid, linoleic acid, linolenic acid, arachidonic acid, docosahexaenoic acid, eicosapentaenoic acid, lactic acid, malic acid, citric acid, benzoic acid, phthalic acid, isophthalic acid, terephthalic acid, salicylic acid, gallic acid, mellitic acid, cinnamic acid, oxalic acid, malonic acid, succinic acid, glutaric acid, adipic acid, fumaric acid, maleic acid, aconitic acid, amino acid, and anthranilic acid, sulfonic acid, and organic phosphonic acid; inorganic acids such as nitric acid, carbonic acid, hydrochloric acid, hypophosphorous acid, phosphorous acid, phosphonic acid, boric acid, and hydrofluoric acid; hydroxides of alkali metals such as potassium hydroxide (KOH); carbonates of alkali metals such as potassium carbonate ($K_2CO_3$) and sodium carbonate ($Na_2CO_3$); hydroxides of Group 2 element; ammonia (ammonium hydroxide); and organic bases such as a quaternary ammonium hydroxide compound.

The pH adjusting agent can be used singly or in combination of two or more kinds thereof.

The content of the pH adjusting agent in the polishing composition may be appropriately selected so as to have a desired pH value of the polishing composition.

As the pH of the polishing composition, a value measured by the method described in Examples is adopted.

<Other Components>

The polishing composition according to an embodiment of the present invention may contain other components at an arbitrary ratio as necessary as long as the effect of the present invention is not impaired. However, since components other than the essential components of the polishing composition according to an embodiment of the present invention may cause foreign substances (residues), it is desirable not to add the components as much as possible, and thus the addition amount thereof is preferably as small as possible. Examples of the other components include an antifungal agent (antiseptic agent), a reducing agent, and an oxidizing agent. The polishing composition according to the present invention is acidic. The polishing composition according to the present invention contains a polymer. Therefore, among these, the polishing composition according to the present invention preferably contains an antifungal agent (antiseptic agent). That is, in an embodiment of the present invention, the polishing composition is substantially composed of an anionically-modified colloidal silica, water, an anionic water-soluble polymer which is a copolymer including a structural unit having a sulfonic acid group or a salt group thereof and a structural unit having a carboxy group or a salt group thereof, a polypropylene glycol having a weight average molecular weight of 200 or more and 700 or less, a nitrogen-free non-ionic polymer other than the polypropylene glycol having a weight average molecular weight of 200 or more and 700 or less, a nitrogen-containing non-ionic polymer, and at least one selected from the group consisting of a pH adjusting agent, an organic solvent, and an antifungal agent. In an embodiment of the present invention, the polishing composition is substantially composed of an anionically-modified colloidal silica, water, an anionic water-soluble polymer which is a copolymer including a structural unit having a sulfonic acid group or a salt group thereof and a structural unit having a carboxy group or a salt group thereof, a polypropylene glycol having a weight average molecular weight of 200 or more and 700 or less, a nitrogen-free non-ionic polymer other than the polypropylene glycol having a weight average molecular weight of 200 or more and 700 or less, a nitrogen-containing non-ionic polymer, a pH adjusting agent, and at least one from an organic solvent and an antifungal agent. Here, "substantially composed of an anionically-modified colloidal silica, water, an anionic water-soluble polymer which is a copolymer including a structural unit having a sulfonic acid group or a salt group thereof and a structural unit having a carboxy group or a salt group thereof, a polypropylene glycol having a weight average molecular weight of 200 or more and 700 or less, a nitrogen-free non-ionic polymer other than the polypropylene glycol having a weight average molecular weight of 200 or more and 700 or less, a nitrogen-containing non-ionic polymer, and at least one selected from the group consisting of a pH adjusting agent, an organic solvent, and an antifungal agent" and "substantially composed of an anionically-modified colloidal silica, water, an anionic water-soluble polymer which is a copolymer including a structural unit having a sulfonic acid group or a salt group thereof and a structural unit having a carboxy group or a salt group thereof, a polypropylene glycol having a weight average molecular weight of 200 or more and 700 or less, a nitrogen-free non-ionic polymer other than the polypropylene glycol having a weight average molecular weight of 200 or more and 700 or less, a nitrogen-containing non-ionic polymer, a pH adjusting agent, and at least one from an organic solvent and an antifungal agent" means that the total content of the anionically-modified colloidal silica, water, the anionic water-soluble polymer which is a copolymer including a structural unit having a sulfonic acid group or a salt group thereof and a structural unit having a carboxy group or a salt group thereof, the polypropylene glycol having a weight average molecular weight of 200 or more and 700 or less, the nitrogen-free non-ionic polymer other than the polypropylene glycol having a weight average molecular weight of 200 or more and 700 or less, the nitrogen-containing non-ionic polymer, the pH adjusting agent, the organic solvent, and the antifungal agent exceeds 99% by mass (upper limit: 100% by mass) with respect to the polishing composition. Preferably, the polishing composition is composed of an anionically-modified colloidal silica, water, an anionic water-soluble polymer which is a copolymer including a structural unit having a sulfonic acid group or a salt group thereof and a structural unit having a carboxy group or a salt group thereof, a polypropylene glycol having a weight average molecular weight of 200 or more and 700 or less, a nitrogen-free non-ionic polymer other than the polypropylene glycol having a weight average molecular weight of 200 or more and 700 or less, a nitrogen-containing non-ionic polymer, a pH adjusting agent, an organic solvent, and an antifungal agent (the total content=100% by mass).

The antifungal agent (antiseptic agent) is not particularly limited, and can be appropriately selected according to the type of polymer. Specific examples thereof include isothiazoline-based antiseptic agents such as 2-methyl-4-isothiazoline-3-one, 5-chloro-2-methyl-4-isothiazoline-3-one, and 1,2-benzisothiazole-3(2H)-one (BIT), and phenoxyethanol.

Alternatively, the antifungal agent (antiseptic agent) may be a compound represented by Chemical Formula 1 below.

[Chemical Formula 1]

(Chemical Formula 1)

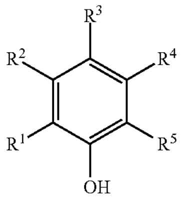

In Chemical Formula 1 above, $R^1$ to $R^5$ are each independently a hydrogen atom or a substituent composed of at least two atoms selected from the group consisting of a carbon atom, a hydrogen atom, and an oxygen atom.

Examples of the substituent composed of at least two atoms selected from the group consisting of a carbon atom, a hydrogen atom, and an oxygen atom include a hydroxy group, a carboxy group, an alkyl group having 1 or more and 20 or less carbon atoms, a hydroxyalkyl group having 1 or more and 20 or less carbon atoms, an alkoxy group having 1 or more and 20 or less carbon atoms, a hydroxyalkoxy group having 1 or more and 20 or less carbon atoms, an alkoxycarbonyl group having 2 or more and 21 or less carbon atoms, an aryl group having 6 or more and 30 or less carbon atoms, an aralkyl group (arylalkyl group) having 7 or more and 31 or less carbon atoms, an aryloxy group having 6 or more and 30 or less carbon atoms, an aryloxycarbonyl group having 7 or more and 31 or less carbon atoms, an aralkyloxycarbonyl group having 8 or more and 32 or less carbon atoms, an acyl group having 1 or more and 20 or less carbon atoms, and an acyloxy group having 1 or more and 20 or less carbon atoms.

More specifically, examples of the alkyl group having 1 or more and 20 or less carbon atoms include linear alkyl groups such as a methyl group, an ethyl group, an n-propyl group, an n-butyl group, an n-pentyl group, an n-hexyl group, an n-heptyl group, an n-octyl group, an n-nonyl group, and an n-decyl group; branched alkyl groups such as an isopropyl group, an isobutyl group, an s-butyl group, a t-butyl group, a t-amyl group, a neopentyl group, a 3-methylpentyl group, a 1,1-diethylpropyl group, a 1,1-dimethylbutyl group, a 1-methyl-1-propylbutyl group, a 1,1-dipropylbutyl group, a 1,1-dimethyl-2-methylpropyl group, and a 1-methyl-1-isopropyl-2-methylpropyl group; and cyclic alkyl groups such as a cyclobutyl group, a cyclopentyl group, a cyclohexyl group, a cycloheptyl group, a cyclooctyl group, and a norbornenyl group.

Examples of the hydroxyalkyl group having 1 or more and 20 or less carbon atoms include a hydroxymethyl group, a 2-hydroxyethyl group, a 2-hydroxy-n-propyl group, a 3-hydroxy-n-propyl group, a 2-hydroxy-n-butyl group, a 3-hydroxy-n-butyl group, a 4-hydroxy-n-butyl group, a 2-hydroxy-n-pentyl group, a 3-hydroxy-n-pentyl group, a 4-hydroxy-n-pentyl group, a 5-hydroxy-n-pentyl group, a 2-hydroxy-n-hexyl group, a 3-hydroxy-n-hexyl group, a 4-hydroxy-n-hexyl group, a 5-hydroxy-n-hexyl group, and a 6-hydroxy-n-hexyl group.

Examples of the alkoxy group having 1 or more and 20 or less carbon atoms include linear alkoxy groups such as a methoxy group, an ethoxy group, an n-propyloxy group, an n-butyloxy group, an n-pentyloxy group, an n-hexyloxy group, an n-heptyloxy group, an n-octyloxy group, an n-nonyloxy group, and an n-decyloxy group; branched alkoxy groups such as an isopropyloxy group, an isobutyloxy group, an s-butyloxy group, a t-butyloxy group, a t-amyloxy group, a neopentyloxy group, a 3-methylpentyloxy group, a 1,1-diethylpropyloxy group, a 1,1-dimethylbutyloxy group, a 1-methyl-1-propylbutyloxy group, a 1,1-dipropylbutyloxy group, a 1,1-dimethyl-2-methylpropyloxy group, and a 1-methyl-1-isopropyl-2-methylpropyloxy group; and cyclic alkoxy groups such as a cyclobutyloxy group, a cyclopentyloxy group, a cyclohexyloxy group, a cycloheptyloxy group, a cyclooctyloxy group, and a norbornenyloxy group.

Examples of the hydroxyalkoxy group having 1 or more and 20 or less carbon atoms include a hydroxymethoxy group, a 2-hydroxyethoxy group, a 2-hydroxy-n-propyloxy group, a 3-hydroxy-n-propyloxy group, a 2-hydroxy-n-butyloxy group, a 3-hydroxy-n-butyloxy group, a 4-hydroxy-n-butyloxy group, a 2-hydroxy-n-pentyloxy group, a 3-hydroxy-n-pentyloxy group, a 4-hydroxy-n-pentyloxy group, a 5-hydroxy-n-pentyloxy group, a 2-hydroxy-n-hexyloxy group, a 3-hydroxy-n-hexyloxy group, a 4-hydroxy-n-hexyloxy group, a 5-hydroxy-n-hexyloxy group, and a 6-hydroxy-n-hexyloxy group.

Examples of the alkoxycarbonyl group having 2 or more and 21 or less carbon atoms include a methoxycarbonyl group, an ethoxycarbonyl group, a propoxycarbonyl group, a butoxycarbonyl group, a pentyloxycarbonyl group, a hexyloxycarbonyl group, an octyloxycarbonyl group, and a decyloxycarbonyl group.

Examples of the aryl group having 6 or more and 30 or less carbon atoms include a phenyl group, a naphthyl group, an anthranil group, and a pyrenyl group.

Examples of the aralkyl group (arylalkyl group) having 7 or more and 31 or less carbon atoms include a benzyl group and a phenethyl group (phenylethyl group), and examples of the aryloxy group having 6 or more and 30 or less carbon atoms include a phenyloxy group (phenoxy group), a naphthyloxy group, an anthraniloxy group, and a pyrenyloxy group.

Examples of the aryloxycarbonyl group having 7 or more and 31 or less carbon atoms include a phenyloxycarbonyl group, a naphthyloxycarbonyl group, an anthranyloxycarbonyl group, and a pyrenyloxycarbonyl group.

Examples of the aralkyloxycarbonyl group having 8 or more and 32 or less carbon atoms include a benzyloxycarbonyl group and a phenethyloxycarbonyl group.

Examples of the acyl group having 1 or more and 20 or less carbon atoms include a methanoyl group (formyl group), an ethanoyl group (acetyl group), a propanoyl group, a butanoyl group, a pentanoyl group, a hexanoyl group, an octanoyl group, a decanoyl group, and a benzoyl group.

Examples of the acyloxy group having 1 or more and 20 or less carbon atoms include a formyloxy group, an acetyloxy group, a propanoyloxy group, a butanoyloxy group, a pentanoyloxy group, a hexanoyloxy group, an octanoyloxy group, a decanoyloxy group, and a benzoyloxy group.

The antifungal agent represented by Chemical Formula 1 above is preferably at least one selected from the group consisting of compounds represented by Chemical Formulas 1-a to 1-c below.

[Chemical Formula 2]

(Chemical Formula 1-a)

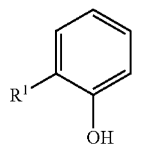

(Chemical Formula 1-b)

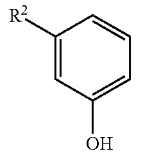

(Chemical Formula 1-c)

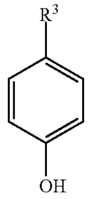

In Chemical Formulas 1-a to 1-c above, $R^1$ to $R^3$ are each independently a hydrogen atom or a substituent composed of at least two atoms selected from the group consisting of a carbon atom, a hydrogen atom, and an oxygen atom.

Examples of the substituent composed of at least two atoms selected from the group consisting of a carbon atom, a hydrogen atom, and an oxygen atom are the same as those described above, and thus the description thereof is omitted here.

More specific examples of the compound represented by Chemical Formula 1 above include parahydroxybenzoic acid esters such as methyl parahydroxybenzoate, ethyl parahydroxybenzoate, butyl parahydroxybenzoate, and benzyl parahydroxybenzoate; salicylic acid, methyl salicylate, phenol, catechol, resorcinol, hydroquinone, isopropylphenol, cresol, thymol, phenoxyethanol, phenylphenol (2-phenylphenol, 3-phenylphenol, or 4-phenylphenol), and 2-phenylethyl alcohol (phenethyl alcohol).

Among these, from the viewpoint of more effectively exhibiting the desired effect of the present invention, the compound represented by Chemical Formula 1 above is preferably at least one selected from the group consisting of ethyl parahydroxybenzoate, butyl parahydroxybenzoate, and phenylphenol, and is more preferably butyl parahydroxybenzoate.

Alternatively, the antifungal agent (antiseptic agent) may be an unsaturated fatty acid. Examples of the unsaturated fatty acid include monounsaturated fatty acids such as crotonic acid, myristoleic acid, palmitoleic acid, oleic acid, and ricinoleic acid; diunsaturated fatty acids such as sorbic acid, linoleic acid, and eicosadienoic acid; triunsaturated fatty acids such as linolenic acid, pinolenic acid, and eleostearic acid; tetraunsaturated fatty acids such as stearidonic acid and arachidonic acid; penta-unsaturated fatty acids such as boseopentaenoic acid and eicosapentaenoic acid; and hexa-unsaturated fatty acids such as docosahexaenoic acid and nicinic acid.

Among these, from the viewpoint of more effectively exhibiting the desired effect of the present invention, the unsaturated fatty acid is preferably sorbic acid.

In addition to the above, 1,2-alkanediols such as 1,2-pentanediol, 1,2-hexanediol, and 1,2-octanediol; alkyl glyceryl ethers such as 2-ethylhexyl glyceryl ether (ethylhexyl glycerin); and compounds such as capric acid and dehydroacetic acid may be used as the antifungal agent (antiseptic agent).

The antifungal agent (antiseptic agent) may be used singly or in combination of two or more kinds thereof.

When the polishing composition contains an antifungal agent (antiseptic agent), the lower limit of the content (concentration) of the antifungal agent (antiseptic agent) is not particularly limited. In the case of a polishing composition (is typically a slurry polishing liquid and is also referred to as a working slurry or a polishing slurry in some cases) directly used, as a polishing liquid, for polishing an object to be polished, the content of the antifungal agent (antiseptic agent) in the polishing composition is preferably 0.0001% by mass or more, more preferably 0.001% by mass or more, further preferably 0.005% by mass or more, and particularly preferably 0.01% by mass or more, with respect to the total mass of the polishing composition. The upper limit of the content (concentration) of the antifungal agent (antiseptic agent) in the polishing composition directly used, as a polishing liquid, for polishing an object to be polished is not particularly limited, and is preferably 5% by mass or less, more preferably 1% by mass or less, further preferably 0.5% by mass or less, and particularly preferably 0.1% by mass or less, with respect to the total mass of the polishing composition. That is, the content (concentration) of the antifungal agent (antiseptic agent) in the polishing composition is preferably 0.0001% by mass or more and 5% by mass or less, more preferably 0.001% by mass or more and 1% by mass or less, further preferably 0.005% by mass or more and 0.5% by mass or less, and particularly preferably 0.01% by mass or more and 0.1% by mass or less, with respect to the total mass of the polishing composition. Within such a range, an effect sufficient to inactivate or destroy microorganisms is obtained. When the polishing composition contains two or more kinds of antifungal agents (antiseptic agents), the content thereof means the total amount thereof.

<Method for Producing Polishing Composition>

As for a method for producing the polishing composition of the present invention, the polishing composition can be obtained, for example, by stirring and mixing anionically-modified colloidal silica, a dispersing medium, the above-described anionic water-soluble polymer, a polypropylene glycol having a weight average molecular weight of 200 or more and 700 or less, a nitrogen-free non-ionic polymer other than the polypropylene glycol having a weight average molecular weight of 200 or more and 700 or less, a nitrogen-containing non-ionic polymer, and other components as necessary. The temperature at which respective components are mixed is not particularly limited, and is preferably 10° C. or higher and 40° C. or lower, and heating may be performed in order to increase the rate of dissolution. The mixing time is also not particularly limited.

<Polishing Method>

Another embodiment of the present invention is a polishing method including a step of polishing an object to be polished by using the above-described polishing composition. According to such a polishing method, residues remaining on a surface of an object to be polished can be sufficiently removed while gently polishing the surface thereof.

The polishing composition according to the present invention is suitably used for polishing a semiconductor substrate as an object to be polished. The polishing method of a semiconductor substrate is roughly divided into a main (bulk) polishing step of performing polishing for removing most of an object to be removed and a finish (buff) polishing step of finish polishing the object. For example, a polishing composition having a high processing force (polishing force) tends to be used in a main (bulk) polishing step of roughly polishing a semiconductor substrate surface, and a polishing composition having a low polishing force tends to be used in a finish (buff) polishing step of more delicately polishing. In an embodiment, the polishing composition of the present invention is suitably used in a finish (buff) polishing step of a semiconductor substrate.

As a polishing apparatus, it is possible to use a general polishing apparatus in which a holder for holding a substrate or the like having an object to be polished and a motor or the like capable of changing the number of revolutions are attached and which has a polishing table to which a polishing pad (polishing cloth) can be attached.

As the polishing pad, a general nonwoven fabric, polyurethane, a porous fluororesin, and the like can be used without particular limitation. The polishing pad is preferably grooved such that a polishing liquid is accumulated.

In the present embodiment, the pressure between the object to be polished and the pad in the polishing step (particularly, the finish polishing step) is preferably 0.3 psi (2.07 kPa) or more and 3 psi (20.7 kPa) or less, and more preferably 0.6 psi (4.14 kPa) or more and 2 psi (13.8 kPa) or less. In the present embodiment, the number of revolutions of a head (carrier) in the polishing step is preferably 50 rpm (0.83 $s^{-1}$) or more and 100 rpm (1.67 $s^{-1}$) or less. In the present embodiment, the number of revolutions of the table in the polishing step is preferably 50 rpm (0.83 $s^{-1}$) or more and 100 rpm (0.83 $s^{-1}$) or less. The supply amount of flow-through in the polishing step is not limited, but the surface of the object to be polished is preferably covered with the polishing composition, and the supply amount thereof is, for example, preferably 50 to 300 ml/min. The polishing time is also not particularly limited, and is preferably to 60 seconds.

The method of supplying the polishing composition to the polishing pad is not particularly limited, and for example, a method of continuously supplying the polishing composition by a pump or the like is adopted. This supply amount is not limited, but it is preferable that the surface of the polishing pad is covered with the polishing composition according to the present invention at all times.

After completion of polishing, the substrate is washed in flowing water, and water droplets attached to the substrate are removed by a spin dryer or the like and dried to obtain a polished object to be polished.

The polishing composition according to the present invention may be a one-liquid type or a multi-liquid type including a two-liquid type.

<Method for Producing Semiconductor Substrate>

The polishing method according to an embodiment of the present invention is suitably used when an object to be polished is a semiconductor substrate. That is, according to still another embodiment of the present invention, the object to be polished is a semiconductor substrate, and there is also provided a method for producing a semiconductor substrate, including polishing the semiconductor substrate by the above-described polishing method. Therefore, according to the present invention, provided is a method for producing a semiconductor substrate, including a step of polishing an object to be polished by a polishing composition containing: anionically-modified colloidal silica; a dispersing medium; an anionic water-soluble polymer which is a copolymer including a structural unit having a sulfonic acid group or a salt group thereof and a structural unit having a carboxy group or a salt group thereof; a polypropylene glycol having a weight average molecular weight of 200 or more and 700 or less; a nitrogen-free non-ionic polymer other than the polypropylene glycol having a weight average molecular weight of 200 or more and 700 or less; and a nitrogen-containing non-ionic polymer. Details of the semiconductor substrate to which such a producing method is applied are as described for the object to be polished to be polished by the polishing composition. In the producing method, for other steps, steps that can be adopted in a known method for producing a semiconductor substrate can be appropriately adopted.

Although the embodiments of the present invention have been described in detail, this is illustrative and exemplary and not restrictive, and it is clear that the scope of the present invention should be interpreted by the appended claims.

The present invention includes the following aspects and embodiments.

1. A polishing composition containing:
   anionically-modified colloidal silica;
   a dispersing medium;
   an anionic water-soluble polymer which is a copolymer including a structural unit having a sulfonic acid group or a salt group thereof and a structural unit having a carboxy group or a salt group thereof;
   a polypropylene glycol having a weight average molecular weight of 200 or more and 700 or less;
   a nitrogen-free non-ionic polymer other than the polypropylene glycol having a weight average molecular weight of 200 or more and 700 or less; and
   a nitrogen-containing non-ionic polymer;
2. The polishing composition described in above item 1., in which the nitrogen-free non-ionic polymer is one or more kinds selected from the group consisting of polyvinyl alcohol, hydroxyethyl cellulose, and polyglycerol;
3. The polishing composition described in above item 1. or 2., in which the nitrogen-containing non-ionic polymer is one or more kinds selected from the group consisting of polyvinylpyrrolidone, poly-N-vinylacetamide, polydimethylacrylamide, poly-N-isopropylacrylamide, poly-N-vinylcaprolactam, and an oxazoline group-containing polymer;
4. The polishing composition described in any one of the above items 1. to 3., in which the nitrogen-free non-ionic polymer is polyvinyl alcohol, and the nitrogen-containing non-ionic polymer is polyvinylpyrrolidone;
5. The polishing composition described in any one of above items 1. to 4., in which a weight average molecular weight of the nitrogen-free non-ionic polymer is 100,000 or less;
6. The polishing composition described in any one of above items 1. to 5., in which a pH is 2.0 or more and less than 5.0;
7. The polishing composition described in any one of above items 1. to 6., further containing an antifungal agent;
8. A polishing method including a step of polishing an object to be polished by using the polishing composition described in any one of above items 1. to 7.; and
9. A method for producing a semiconductor substrate including polishing a semiconductor substrate by the polishing method described in the above item 8.

EXAMPLES

The present invention will be described in more detail with the following Examples and Comparative Examples. However, the technical scope of the present invention is not limited only to the following Examples. Unless otherwise specified, "%" and "part(s)" mean "% by mass" and "part(s) by mass". In the following Examples, unless otherwise specified, the operation was performed under the conditions of room temperature (25° C.)/relative humidity of 40% RH or more and 50% RH or less.

Preparation of Abrasive Grains

Sulfonic acid-modified colloidal silica (produced by the method described in "Sulfonic acid-functionalized silica through quantitative oxidation of thiol groups", Chem. Commun. 246-247 (2003), average primary particle size: 32 nm, average secondary particle size: 69 nm, average association degree: 2.2) was prepared as the anionically-modified colloidal silica.

The average primary particle size of the anionically-modified colloidal silica particles was calculated from the specific surface area of the silica particles measured by the BET method using "Flow Sorb II 2300" manufactured by Micromeritics Instrument Corporation and the density of the silica particles. The average secondary particle size of the anionically-modified colloidal silica particles was measured by a dynamic light scattering particle size and particle size distribution apparatus UPA-UTI151 manufactured by NIKKISO CO., LTD. The average association degree of the abrasive grains was calculated by dividing the value of the average secondary particle size of the abrasive grains by the value of the average primary particle size of the abrasive grains.

Preparation of Polymers

The following anionic water-soluble polymer, additive, nitrogen-free non-ionic polymer, and nitrogen-containing non-ionic polymer were prepared.

"Anionic Water-Soluble Polymer"

Sodium salt of a copolymer of acrylic acid and 2-acrylamide-2-methylpropane sulfonic acid (hereinafter, sodium salt of "(acrylic acid/sulfonic acid) copolymer") (product name: ARON A-6012 (TOAGOSEI CO., LTD.)); weight average molecular weight 10,000

"Additive"

Polypropylene glycol

NEWPOL (registered trademark) PP-200 (Sanyo Chemical Industries, Ltd.): weight average molecular weight 200

Polypropylene glycol 400 (FUJIFILM Wako Pure Chemical Corporation): weight average molecular weight 400

Polypropylene glycol 700 (FUJIFILM Wako Pure Chemical Corporation): weight average molecular weight 700

Polypropylene glycol 1000 (FUJIFILM Wako Pure Chemical Corporation): weight average molecular weight 1000

Polypropylene glycol 2000 (FUJIFILM Wako Pure Chemical Corporation): weight average molecular weight 2000

Polyethylene Glycol

PEG200 (DKS Co. Ltd.): weight average molecular weight 200

PEG600 (DKS Co. Ltd.): weight average molecular weight 600

Polyethylene glycol 1000 (FUJIFILM Wako Pure Chemical Corporation): weight average molecular weight 1000

Polyethylene glycol 2000 (FUJIFILM Wako Pure Chemical Corporation): weight average molecular weight 2000

"Nitrogen-Free Non-Ionic Polymer"

Polyvinyl Alcohol

JMR-3HH (JAPAN VAM & POVAL CO., LTD.): weight average molecular weight 5,000

JMR-10HH (JAPAN VAM & POVAL CO., LTD.): weight average molecular weight 10,000

JMR-170HH (JAPAN VAM & POVAL CO., LTD.): weight average molecular weight 77,000

DENKA POVAL (registered trademark) K-05 (Denka Company Limited): weight average molecular weight 22,000

Hydroxyethyl Cellulose

Hydroxyethyl cellulose (Sigma-Aldrich Japan): weight average molecular weight 25,000

"Nitrogen-Containing Non-Ionic Polymer"

Polyvinylpyrrolidone

PITZCOL (registered trademark) K30A (DKS Co. Ltd.); weight average molecular weight 45,000

PITZCOL (registered trademark) K17L (DKS Co. Ltd.); weight average molecular weight 9,000

Poly-N-Vinylacetamide

PNVA GE191-107 (Showa Denko K.K.); weight average molecular weight 50,000

PNVA GE191-104 (Showa Denko K.K.); weight average molecular weight 300,000

Polydimethylacrylamide

Poly(N,N-dimethylacrylamide) (Sigma-Aldrich Japan); weight average molecular weight 10,000

Poly-N-Isopropylacrylamide

Poly(N-isopropylacrylamide) (Sigma-Aldrich Japan); weight average molecular weight 40,000

Poly-N-Vinylcaprolactam

Luviskol (registered trademark) Plus (BASF Japan Ltd.); weight average molecular weight 70,000

Oxazoline Group-Containing Polymer

EPOCROS (registered trademark) WS-700 (NIPPON SHOKUBAI CO., LTD.); weight average molecular weight 40,000

The weight average molecular weight (Mw) of each of the polymers described above was measured by the following method.

Measurement of Weight Average Molecular Weight (Mw) of Polymer

As the weight average molecular weight (Mw) of the polymer, a value of a weight average molecular weight (in terms of polyethylene glycol) measured by gel permeation chromatography (GPC) was used. The weight average molecular weight was measured by the following apparatus and conditions.

GPC apparatus: manufactured by SHIMADZU CORPORATION

Model: Prominence+ELSD detector (ELSD-LTII)

Column: VP-ODS (manufactured by SHIMADZU CORPORATION)

Mobile phase A: MeOH

B: 1% acetic acid aqueous solution

Flow rate: 1 mL/min

Detector: ELSD temp. 40° C., Gain 8, $N_2$ GAS 350 kPa

Oven temperature: 40° C.

Injection amount: 40 μL pH of Polishing Composition

As for the pH of the polishing composition, by using a glass electrode type hydrogen ion concentration indicator (Model: F-23 manufactured by HORIBA, Ltd.), three-point calibration was performed with a standard buffer solutions (a phthalate pH buffer solution at pH: 4.01 (25° C.), a neutral phosphate pH buffer solution at pH: 6.86 (25° C.), and a carbonate pH buffer solution at pH: 10.01 (25° C.)), and then a glass electrode was placed in the polishing composition, and a stabilized value after 2 minutes or longer was regarded as a pH value.

Preparation of Polishing Composition

Example 1

The anionically-modified colloidal silica obtained above was added as the abrasive grains to pure water as the dispersing medium at room temperature (25° C.) so as to be 1% by mass with respect to the total mass of the polishing composition to be finally obtained, and an antifungal agent (a 1,2-benzisothiazol-3(2H)-one aqueous solution (trade name: San-ai bac R-30); manufactured by San-Ai Oil Co., Ltd.) was further added as the antifungal agent so that the final concentration reached 0.3 g/kg, thereby obtaining a mixed solution.

The obtained mixed solution was mixed with an (acrylic acid/sulfonic acid) copolymer having a weight average molecular weight of 10,000 as the anionic water-soluble polymer; a polypropylene glycol having a weight average molecular weight of 400 as the additive; a polyvinyl alcohol having a weight average molecular weight of 10,000 as the nitrogen-free non-ionic polymer; and a polyvinylpyrrolidone having a weight average molecular weight of 45,000 as the nitrogen-containing non-ionic polymer under stirring at 25° C. for 5 minutes. Thereafter, the mixed solution was adjusted to pH 2.5 using nitric acid, thereby obtaining a polishing composition of Example 1.

Here, the content of the (acrylic acid/sulfonic acid) copolymer was 0.25% by mass with respect to the total mass of the polishing composition; the content of the polypropylene glycol was 0.20% by mass with respect to the total mass of the polishing composition; the content of the polyvinyl alcohol was 0.10% by mass with respect to the total mass of the polishing composition; and the content of the polyvinylpyrrolidone was 0.10% by mass with respect to the total mass of the polishing composition.

Examples 2 to 27 and Comparative Example 1 to 13

Polishing compositions of Examples 2 to 27 and Comparative Examples 1 to 13 were prepared in the same manner as in Example 1, except that the kinds and/or contents of the abrasive grains, the anionic water-soluble polymer, the additive, the nitrogen-free non-ionic polymer, and the nitrogen-containing non-ionic polymer were changed as described in Table 1 below.

In Tables 1A to 1C, "PPG" represents "polypropylene glycol", "PEG" represents "polyethylene glycol", "PVA" represents "polyvinyl alcohol", "HEC" represents "hydroxyethyl cellulose", "PVP" represents polyvinylpyrrolidone, "PNVA" represents poly-N-vinylacetamide, "PDMA" represents polydimethylacrylamide, "PNIPAM" represents poly-N-isopropylacrylamide, and "PNVCL" represents poly-N-vinylcaprolactam.

"-" in Table 1 below indicates that the relevant agent was not used. Comparative Example 1 is an example not using a nitrogen-containing non-ionic polymer, and Comparative Examples 2 to 5 are examples not using a nitrogen-free non-ionic polymer. Comparative Example 6 is an example not using an (acrylic acid/sulfonic acid) copolymer having a weight average molecular weight of 10,000 as the anionic water-soluble polymer, and Comparative Example 7 is an example not using a polypropylene glycol having a weight average molecular weight of 200 or more and 700 or less as the additive.

TABLE 1A

| | Abrasive grains | Anionic water-soluble polymer | Additive | | | Nitrogen-free non-ionic polymer | | | Nitrogen-containing non-ionic polymer | | | |
|---|---|---|---|---|---|---|---|---|---|---|---|---|
| | Content [% by mass] | Content [% by mass] | Compound | Mw | Content [% by mass] | Compound | Mw | Content [% by mass] | Compound | Mw | Content [% by mass] | pH |
| Example 1 | 1.0 | 0.25 | PPG | 400 | 0.20 | PVA | 10000 | 0.10 | PVP | 45000 | 0.10 | 2.5 |
| Example 2 | 1.0 | 0.25 | PPG | 400 | 0.20 | PVA | 10000 | 0.10 | PVP | 9000 | 0.10 | 2.5 |
| Example 3 | 1.0 | 0.25 | PPG | 400 | 0.20 | PVA | 10000 | 0.10 | PNVA | 50000 | 0.10 | 2.5 |
| Example 4 | 1.0 | 0.25 | PPG | 400 | 0.20 | PVA | 10000 | 0.10 | PNVA | 300000 | 0.10 | 2.5 |
| Example 5 | 1.0 | 0.25 | PPG | 400 | 0.20 | PVA | 5000 | 0.10 | PVP | 45000 | 0.10 | 2.5 |
| Example 6 | 1.0 | 0.25 | PPG | 400 | 0.20 | PVA | 22000 | 0.10 | PVP | 45000 | 0.10 | 2.5 |
| Example 7 | 1.0 | 0.25 | PPG | 400 | 0.20 | PVA | 77000 | 0.10 | PVP | 45000 | 0.10 | 2.5 |
| Example 8 | 1.0 | 0.25 | PPG | 400 | 0.20 | HEC | 25000 | 0.10 | PVP | 45000 | 0.10 | 2.5 |
| Example 9 | 0.5 | 0.25 | PPG | 400 | 0.20 | PVA | 10000 | 0.10 | PVP | 45000 | 0.10 | 2.5 |
| Example 10 | 1.5 | 0.25 | PPG | 400 | 0.20 | PVA | 10000 | 0.10 | PVP | 45000 | 0.10 | 2.5 |
| Example 11 | 2.0 | 0.25 | PPG | 400 | 0.20 | PVA | 10000 | 0.10 | PVP | 45000 | 0.10 | 2.5 |
| Example 12 | 1.0 | 0.05 | PPG | 400 | 0.20 | PVA | 10000 | 0.10 | PVP | 45000 | 0.10 | 2.5 |
| Example 13 | 1.0 | 0.10 | PPG | 400 | 0.20 | PVA | 10000 | 0.10 | PVP | 45000 | 0.10 | 2.5 |
| Example 14 | 1.0 | 0.50 | PPG | 400 | 0.20 | PVA | 10000 | 0.10 | PVP | 45000 | 0.10 | 2.5 |

TABLE 1B

| | Abrasive grains | Anionic water-soluble polymer | Additive | | | Nitrogen-free non-ionic polymer | | | Nitrogen-containing non-ionic polymer | | | |
|---|---|---|---|---|---|---|---|---|---|---|---|---|
| | Content [% by mass] | Content [% by mass] | Compound | Mw | Content [% by mass] | Compound | Mw | Content [% by mass] | Compound | Mw | Content [% by mass] | pH |
| Example 15 | 1.0 | 0.25 | PPG | 400 | 0.05 | PVA | 10000 | 0.10 | PVP | 45000 | 0.10 | 2.5 |
| Example 16 | 1.0 | 0.25 | PPG | 400 | 0.10 | PVA | 10000 | 0.10 | PVP | 45000 | 0.10 | 2.5 |
| Example 17 | 1.0 | 0.25 | PPG | 400 | 0.30 | PVA | 10000 | 0.10 | PVP | 45000 | 0.10 | 2.5 |
| Example 18 | 1.0 | 0.25 | PPG | 200 | 0.20 | PVA | 10000 | 0.10 | PVP | 45000 | 0.10 | 2.5 |
| Example 19 | 1.0 | 0.25 | PPG | 700 | 0.20 | PVA | 10000 | 0.10 | PVP | 45000 | 0.10 | 2.5 |
| Example 20 | 1.0 | 0.25 | PPG | 400 | 0.20 | PVA | 10000 | 0.10 | PVP | 45000 | 0.10 | 2.0 |
| Example 21 | 1.0 | 0.25 | PPG | 400 | 0.20 | PVA | 10000 | 0.10 | PVP | 45000 | 0.10 | 3.0 |
| Example 22 | 1.0 | 0.25 | PPG | 400 | 0.20 | PVA | 10000 | 0.10 | PVP | 45000 | 0.10 | 3.5 |
| Example 23 | 1.0 | 0.25 | PPG | 400 | 0.20 | PVA | 10000 | 0.10 | PVP | 45000 | 0.10 | 4.0 |
| Example 24 | 1.0 | 0.25 | PPG | 400 | 0.20 | PVA | 10000 | 0.10 | PDMA | 10000 | 0.10 | 2.5 |
| Example 25 | 1.0 | 0.25 | PPG | 400 | 0.20 | PVA | 10000 | 0.10 | PNIPAM | 40000 | 0.10 | 2.5 |
| Example 26 | 1.0 | 0.25 | PPG | 400 | 0.20 | PVA | 10000 | 0.10 | PNVCL | 70000 | 0.10 | 2.5 |
| Example 27 | 1.0 | 0.25 | PPG | 400 | 0.20 | PVA | 10000 | 0.10 | Oxazoline group-containing polymer | 40000 | 0.10 | 2.5 |

TABLE 1C

| | Abrasive grains | Anionic water-soluble polymer | Additive | | | Nitrogen-free non-ionic polymer | | | Nitrogen-containing non-ionic polymer | | | |
|---|---|---|---|---|---|---|---|---|---|---|---|---|
| | Content [% by mass] | Content [% by mass] | Compound | Mw | Content [% by mass] | Compound | Mw | Content [% by mass] | Compound | Mw | Content [% by mass] | pH |
| Comparative Example 1 | 1.0 | 0.25 | PPG | 400 | 0.20 | PVA | 10000 | 0.10 | — | — | — | 2.5 |
| Comparative Example 2 | 1.0 | 0.25 | PPG | 400 | 0.20 | — | — | — | PNVA | 50000 | 0.10 | 2.5 |
| Comparative Example 3 | 1.0 | 0.25 | PPG | 400 | 0.20 | — | — | — | PNVA | 300000 | 0.10 | 2.5 |
| Comparative Example 4 | 1.0 | 0.25 | PPG | 400 | 0.20 | — | — | — | PVP | 9000 | 0.10 | 2.5 |
| Comparative Example 5 | 1.0 | 0.25 | PPG | 400 | 0.20 | — | — | — | PVP | 45000 | 0.10 | 2.5 |
| Comparative Example 6 | 1.0 | 0.00 | PPG | 400 | 0.20 | PVA | 10000 | 0.10 | PVP | 45000 | 0.10 | 2.5 |
| Comparative Example 7 | 1.0 | 0.25 | PPG | 400 | 0.00 | PVA | 10000 | 0.10 | PVP | 45000 | 0.10 | 2.5 |
| Comparative Example 8 | 1.0 | 0.25 | PPG | 1000 | 0.20 | PVA | 10000 | 0.10 | PVP | 45000 | 0.10 | 2.5 |
| Comparative Example 9 | 1.0 | 0.25 | PPG | 2000 | 0.20 | PVA | 10000 | 0.10 | PVP | 45000 | 0.10 | 2.5 |
| Comparative Example 10 | 1.0 | 0.25 | PEG | 200 | 0.20 | PVA | 10000 | 0.10 | PVP | 45000 | 0.10 | 2.5 |
| Comparative Example 11 | 1.0 | 0.25 | PEG | 600 | 0.20 | PVA | 10000 | 0.10 | PVP | 45000 | 0.10 | 2.5 |
| Comparative Example 12 | 1.0 | 0.25 | PEG | 1000 | 0.20 | PVA | 10000 | 0.10 | PVP | 45000 | 0.10 | 2.5 |
| Comparative Example 13 | 1.0 | 0.25 | PEG | 2000 | 0.20 | PVA | 10000 | 0.10 | PVP | 45000 | 0.10 | 2.5 |

Polishing Test

As the object to be polished, (1) a polycrystalline silicon wafer (300 mm, manufactured by Advanced Materials Technology, INC.), (2) a silicon wafer having a TEOS film having a thickness of 10000 Å formed on a surface thereof (TEOS substrate) (300 mm, blanket wafer, manufactured by ADVANTEC CO., LTD.), and (3) a silicon wafer having a SiN film having a thickness of 2500 Å formed on a surface thereof (SiN substrate) (300 mm, blanket wafer, manufactured by ADVANTEC CO., LTD.) were prepared.

The polycrystalline silicon wafer, the TEOS substrate, and the SiN substrate prepared above were polished under the following conditions using each of the polishing compositions prepared in Examples 1 to 27 and Comparative Examples 1 to 13.

<Polishing Apparatus and Polishing Conditions>

Polishing apparatus: FREX300E manufactured by EBARA CORPORATION

Polishing pad: Hard polyurethane pad IC1010 manufactured by Nitta DuPont Co., Ltd.

Conditioner (dresser): Nylon brush (A188, manufactured by 3M)

Polishing pressure: 2.0 psi (1 psi=6894.76 Pa, the same applies hereinafter)

Number of revolutions of polishing table: 80 rpm

Number of revolutions of head: 80 rpm

Supply of polishing composition: flow-through

Supply amount of polishing composition: 200 mL/min

Polishing time: 30 seconds

Evaluation

The polishing speed and the number of residues were evaluated according to the following evaluation methods.

(Polishing Speed)

The polishing speed (polishing rate) (Å/min) was calculated by the following formula.

[Mathematical Formula 1]

$$\text{Polishing rate } [\text{Å/min}] = \frac{\text{Film thickness before polishing } [\text{Å}] - \text{Film thickness after polishing}}{\text{Polishing time } [\text{min}]}$$

The film thickness (A) of the object to be polished before and after polishing was determined by an optical film thickness measuring instrument (ASET-f5x: manufactured by KLA-Tencor Corporation), and the polishing speed (polishing rate) (Å/min) was evaluated by dividing a difference in thickness before and after polishing by the polishing time. The polishing speed by the polishing composition according to an embodiment of the present invention is preferably 5 (Å/min) or more and 50 (Å/min) or less, more preferably 10 (Å/min) or more and 40 (Å/min) or less, and further preferably 10 (Å/min) or more and 30 (Å/min) or less. In Table 1 below, the polishing speeds of the polysilicon (Poly-Si) substrate, the TEOS substrate, and the silicon nitride (SiN) substrate are described in the sections of "poly-Si", "TEOS", and "SiN", respectively.

(Measurement of Number of Residues)

The number of residues on the surface of each of the Poly-Si substrate, the TEOS substrate, and the SiN substrate after the polishing treatment was evaluated using an optical inspection machine Surfscan (registered trademark) SP5 manufactured by KLA-Tencor Corporation. Specifically, the number of residues which exceed a diameter of 70 nm in the Poly-Si substrate and a diameter of 50 nm in the TEOS substrate and the SiN substrate was counted for the remaining portion excluding a portion having a width of 5 mm (a portion from a width of 0 mm to a width of 5 mm when the outer peripheral end portion is 0 mm) from the outer peripheral end portion of one surface of the polished TEOS substrate, Poly-Si substrate, and SiN substrate. The evaluation results are shown in Tables 2A and 2B below.

TABLE 2A

| | Polishing speed | | | Number of residues | | |
|---|---|---|---|---|---|---|
| | poly-Si [Å/min] | TEOS [Å/min] | SiN [Å/min] | poly-Si (>70 nm) | TEOS (>50 nm) | SiN (>50 nm) |
| Example 1 | 21 | 25 | 15 | 1312 | 281 | 288 |
| Example 2 | 26 | 32 | 16 | 1552 | 336 | 352 |
| Example 3 | 29 | 27 | 17 | 1528 | 385 | 323 |
| Example 4 | 24 | 29 | 18 | 1411 | 325 | 344 |
| Example 5 | 23 | 26 | 17 | 1662 | 298 | 311 |
| Example 6 | 27 | 31 | 19 | 1815 | 322 | 309 |
| Example 7 | 34 | 26 | 18 | 2642 | 315 | 301 |
| Example 8 | 26 | 25 | 18 | 1935 | 361 | 322 |
| Example 9 | 19 | 19 | 11 | 1355 | 311 | 310 |
| Example 10 | 37 | 41 | 33 | 2037 | 518 | 522 |
| Example 11 | 47 | 46 | 43 | 2514 | 773 | 698 |
| Example 12 | 26 | 31 | 44 | 1515 | 382 | 618 |
| Example 13 | 27 | 29 | 35 | 1583 | 310 | 542 |
| Example 14 | 25 | 28 | 9 | 1418 | 327 | 191 |
| Example 15 | 45 | 26 | 18 | 1418 | 296 | 291 |
| Example 16 | 32 | 28 | 20 | 1409 | 312 | 318 |
| Example 17 | 16 | 29 | 21 | 2233 | 343 | 339 |
| Example 18 | 31 | 28 | 29 | 1302 | 341 | 199 |
| Example 19 | 11 | 26 | 20 | 2241 | 302 | 210 |
| Example 20 | 20 | 26 | 18 | 1346 | 296 | 301 |
| Example 21 | 22 | 29 | 18 | 1418 | 318 | 326 |
| Example 22 | 23 | 31 | 35 | 1575 | 378 | 512 |
| Example 23 | 26 | 28 | 41 | 1662 | 365 | 743 |
| Example 24 | 28 | 31 | 19 | 1429 | 319 | 297 |
| Example 25 | 22 | 28 | 21 | 1398 | 321 | 316 |
| Example 26 | 23 | 30 | 20 | 1512 | 308 | 299 |
| Example 27 | 29 | 30 | 17 | 1509 | 299 | 306 |

TABLE 2B

| | Polishing speed | | | Number of residues | | |
|---|---|---|---|---|---|---|
| | poly-Si [Å/min] | TEOS [Å/min] | SiN [Å/min] | poly-Si (>70 nm) | TEOS (>50 nm) | SiN (>50 nm) |
| Comparative Example 1 | 23 | 378 | 22 | 12635 | 1025 | 296 |
| Comparative Example 2 | 26 | 31 | 16 | 6643 | 307 | 331 |
| Comparative Example 3 | 26 | 28 | 16 | 6802 | 292 | 296 |
| Comparative Example 4 | 27 | 29 | 24 | 6623 | 315 | 329 |
| Comparative Example 5 | 29 | 32 | 18 | 7105 | 303 | 300 |
| Comparative Example 6 | 28 | 33 | 484 | 1664 | 365 | >50000 |
| Comparative Example 7 | 223 | 29 | 19 | 1251 | 300 | 313 |
| Comparative Example 8 | 4 | 31 | 23 | 10503 | 413 | 398 |
| Comparative Example 9 | 2 | 34 | 19 | 12207 | 553 | 576 |
| Comparative Example 10 | 165 | 29 | 20 | 1082 | 316 | 352 |
| Comparative Example 11 | 98 | 29 | 21 | 1319 | 327 | 338 |

TABLE 2B-continued

| | Polishing speed | | | Number of residues | | |
|---|---|---|---|---|---|---|
| | poly-Si [Å/min] | TEOS [Å/min] | SiN [Å/min] | poly-Si (>70 nm) | TEOS (>50 nm) | SiN (>50 nm) |
| Comparative Example 12 | 69 | 32 | 22 | 2376 | 389 | 321 |
| Comparative Example 13 | 47 | 30 | 25 | 5214 | 400 | 365 |

As is apparent from Tables 2A and 2B above, it was found that the polishing compositions of Examples 1 to 27 can reduce the number of residues on the surface of the object to be polished while reducing the polishing speed of the surface of the object to be polished as compared with the polishing compositions of Comparative Examples 1 to 13. In particular, it was found that the polishing compositions of Examples 1 to 27 can also reduce the number of residues on the surface of the object to be polished while reducing the polishing speed of the surface of the object to be polished to 50 Å/min or less in both the object to be polished having a hydrophobic surface such as polycrystalline silicon and the object to be polished having a hydrophilic surface such as silicon oxide and silicon nitride as compared with the polishing compositions of Comparative Examples 1 to 13.

What is claimed is:

1. A polishing composition comprising:

anionically-modified colloidal silica;

a dispersing medium;

an anionic water-soluble polymer which is a copolymer including a structural unit having a sulfonic acid group or a salt group thereof and a structural unit having a carboxy group or a salt group thereof;

a polypropylene glycol having a weight average molecular weight of 200 or more and 700 or less;

a nitrogen-free non-ionic polymer other than the polypropylene glycol; and a nitrogen-containing non-ionic polymer.

2. The polishing composition according to claim 1, wherein the nitrogen-free non-ionic polymer is one or more kinds selected from the group consisting of polyvinyl alcohol, hydroxyethyl cellulose, and polyglycerol.

3. The polishing composition according to claim 1, wherein the nitrogen-containing non-ionic polymer is one or more kinds selected from the group consisting of polyvinylpyrrolidone, poly-N-vinylacetamide, polydimethylacrylamide, poly-N-isopropylacrylamide, poly-N-vinylcaprolactam, and an oxazoline group-containing polymer.

4. The polishing composition according to claim 1, wherein the nitrogen-free non-ionic polymer is polyvinyl alcohol, and the nitrogen-containing non-ionic polymer is polyvinylpyrrolidone.

5. The polishing composition according to claim 1, wherein a weight average molecular weight of the nitrogen-free non-ionic polymer is 100,000 or less.

6. The polishing composition according to claim 1, wherein a pH is 2.0 or more and less than 5.0.

7. The polishing composition according to claim 1, further comprising an antifungal agent.

8. The polishing composition according to claim 7, wherein the antifungal agent is an isothiazoline-based antiseptic agent.

9. A polishing method comprising a step of polishing an object to be polished by using the polishing composition according to claim 1.

10. A method for producing a semiconductor substrate, comprising polishing a semiconductor substrate by the polishing method according to claim 9.

* * * * *